(12) United States Patent
Liu et al.

(10) Patent No.: US 7,633,429 B1
(45) Date of Patent: Dec. 15, 2009

(54) MONOPULSE RADAR SIGNAL PROCESSING FOR ROTORCRAFT BROWNOUT AID APPLICATION

(75) Inventors: Guoqing Liu, Cypress, CA (US); Ken Yang, Torrance, CA (US)

(73) Assignee: BAE Systems Controls Inc., Johnson City, NY (US)

( * ) Notice: Subject to any disclaimer, the term of this patent is extended or adjusted under 35 U.S.C. 154(b) by 0 days.

(21) Appl. No.: 12/357,921

(22) Filed: Jan. 22, 2009

(51) Int. Cl.
*G01S 13/44* (2006.01)

(52) U.S. Cl. .................. 342/33; 342/107; 342/123; 342/133; 342/140; 342/180; 342/195

(58) Field of Classification Search .............. 342/33–36, 342/80, 107, 113, 120, 123, 133–135, 139–142, 342/179–180, 195, 197
See application file for complete search history.

(56) References Cited

U.S. PATENT DOCUMENTS

| | | | | |
|---|---|---|---|---|
| 3,153,234 | A * | 10/1964 | Begeman et al. | 342/152 |
| 3,320,609 | A * | 5/1967 | Jacomini | 342/149 |
| 5,831,570 | A * | 11/1998 | Ammar et al. | 342/26 B |
| 6,246,359 | B1 * | 6/2001 | Asano et al. | 342/158 |
| 6,311,108 | B1 | 10/2001 | Ammar et al. | |
| 6,591,171 | B1 * | 7/2003 | Ammar et al. | 701/16 |
| 6,801,156 | B1 | 10/2004 | Wasiewicz | |
| 6,809,679 | B2 * | 10/2004 | LaFrey et al. | 342/37 |

(Continued)

FOREIGN PATENT DOCUMENTS

| | | |
|---|---|---|
| RU | 2192654 C2 * | 11/2002 |
| RU | 2200962 C2 * | 3/2003 |

OTHER PUBLICATIONS

U.S. Appl. No. 12/233,173, filed Sep. 18, 2008, entitled "Range and Azimuth Resolution Enhancement for Real-Beam Radar," First Named Inventor: Guoqing Liu.
http://www.mc.com/mediacenter/pressrelease Sep. 24, 2007 Press Release, visited Jan. 20, 2009.

*Primary Examiner*—John B Sotomayor
(74) *Attorney, Agent, or Firm*—Scully, Scott, Murphy & Presser, P.C.; Paul J. Esatto, Jr.

(57) ABSTRACT

A method, system and computer program is disclosed for reducing range and angular ambiguities in a target data matrix output from a real beam monopulse radar sensor within a single beam for use in terrain morphing applications employed by brownout take-off and landing aid systems. One or more range bins are calculated to selectively determine one or more range segments from one or more targets of interest. Range resolution enhancement processing is employed to the selectively determined one or more range segments to obtain a range of target scatter locations. A monopulse angle bin is estimated from the obtained range of target scatter locations and one or more control inputs. Elevation and azimuth angular binning is applied to the estimated monopulse angle bin to obtain a smaller coverage area among one or more possible target areas. One or more shortest-range bins in a two-dimensional (2D) azimuth and elevation grid is selected from the smaller coverage area, which generate the target data output matrix from the selected one or more shortest-range bins in the two-dimensional (2D) azimuth and elevation grid.

29 Claims, 3 Drawing Sheets

U.S. PATENT DOCUMENTS

| | | |
|---|---|---|
| 7,068,211 B2 | 6/2006 | Oswald et al. |
| 7,227,493 B2 | 6/2007 | Oswald et al. |
| 7,250,902 B2 | 7/2007 | Manoogian et al. |
| 2004/0046687 A1* | 3/2004 | LaFrey et al. ............... 342/33 |
| 2004/0119633 A1 | 6/2004 | Oswald et al. |
| 2004/0178943 A1* | 9/2004 | Niv ............................ 342/29 |
| 2004/0196172 A1 | 10/2004 | Wasiewicz |
| 2005/0253748 A1 | 11/2005 | Brookner |
| 2006/0044177 A1 | 3/2006 | Wittenberg et al. |
| 2009/0015463 A1* | 1/2009 | Tschernitz et al. .......... 342/146 |

* cited by examiner

MONOPULSE RADAR SIGNAL PROCESSING FOR ROTORCRAFT BROWNOUT AID APPLICATION

CROSS-REFERENCE TO RELATED APPLICATIONS

The present invention is related to the following commonly-owned, co-pending United States Patent Application, the entire contents and disclosure is expressly incorporated by reference herein as if fully set forth herein: U.S. patent application Ser. No. 12/233,173 filed on Sep. 19, 2008, for "RANGE AND AZIMUTH RESOLUTION ENHANCEMENT FOR REAL-BEAM RADAR."

FIELD OF THE INVENTION

The present invention generally relates to monopulse radar systems and, more particularly, to a novel technique for enhancing range resolution and angle estimation resolution data employed in terrain morphing applications for use in rotorcraft brownout take-off and landing aid systems.

BACKGROUND OF THE INVENTION

Description of the Prior Art

It is well known that helicopters have an advantage over fixed-wing aircraft in that they can land in many places that fixed-wing aircraft cannot. However, helicopters must contend with a plethora of obstacles in take off and landing operations beyond the typical ground hazard or foul weather. For example, one of the most dangerous aspects of flying helicopters involves landing in desert-like environments. In a desert-like environment or in dry terrain marked with sparse vegetation or ground covering, brownouts can occur when attempting to land on dusty terrain. A brownout occurs as a result of the downwash created as the rotors of the helicopter pick up dust or dirt on the ground, reducing significantly the pilot's visibility caused by spatial disorientation.

To address this problem rotorcraft brownout take-off and landing aid systems employ radar systems that can detect terrain and obstacles allowing pilots to maintain orientation with the terrain and provide situational awareness. In such conventional radar systems employed by brownout take-off and landing aid systems, an amplitude comparison monopulse technique for angle estimation has been suggested. However, angle resolution of an amplitude comparison technique is limited by antenna beamwidth. For example, if multiple scatters exist in the same range bin and at the same azimuth angle, it provides only one elevation angle output that is an estimate of the weighted average of all scatters for an actual elevation angle. Hence, this conventional technique can only be used in one individual dimension and does not deal with data output for terrain morphing applications.

Therefore, having set forth the limitations of the prior art, it is clear that what is required is a signal processing approach to enhance angle estimation resolution without requiring modification of radar front-end.

BRIEF SUMMARY OF INVENTION

The present invention describes a method of reducing range and angular ambiguities in a target data matrix output from a real beam monopulse radar sensor within a single beam for use in terrain morphing applications employed by brownout take-off and landing aid systems.

Specifically, one or more range bins are calculated to selectively determine one or more range segments from one or more targets of interest. Next, range super resolution processing is employed to the selectively determined one or more range segments to obtain a range of target scatter locations. A monopulse angle bin is estimated from the obtained range of target scatter locations and one or more control inputs. Elevation and azimuth angular binning is then applied to the estimated monopulse angle bin to obtain a smaller coverage area among one or more possible target areas. One or more shortest-range bins in a two-dimensional (2D) azimuth and elevation grid is selected from the smaller coverage area, which generate the target data output matrix.

In the present invention, range super resolution processing may employ Capon Beamforming (CB) filtering to pass a frequency f of interest undistorted while attenuating all other frequencies.

In one embodiment of the present invention the monopulse angle bin estimation is obtained by selecting from at least one case of interest, such as (1) elevation monopulse only; (2) simultaneous azimuth and elevation monopulse; or (3) alternative azimuth and elevation monopulse.

In the step of selecting one or more shortest-range bins in the two-dimensional (2D) azimuth and elevation grid, all range bins that are located in the same azimuth bin are grouped. Similarly, all elevation bins that are located in the same elevation bin are grouped. Moreover, the first range bin in the same group are selected.

In the step of selecting one or more shortest-range bins in the two-dimensional (2D) azimuth and elevation grid further comprises the steps of performing motion compensation on the grouped range and elevation bins for eliminating Doppler effect due to relative motion between an aircraft and an illuminated target; and obtaining a target height estimation from an object elevation angle measurement and a radar height data output from the one or more control inputs.

The target data output matrix comprises one or more azimuth angle vectors, one or more elevation angle vectors, a vector indicating a range to the real beam monopulse radar sensor, and a vector indicating intensity and height of the one or more targets of interest.

An aircraft's attitude parameters and guide angle, and the monopulse radar's radar beam pointing angles and height above ground level are used to calculate the one or more range bins.

In the case of interest "(1) elevation monopulse only case of interest," the monopulse radar system is aimed to attain target elevation angle measurement and no monopulse is applied to the azimuth dimension.

In the case of interest "(2) simultaneous azimuth and elevation monopulse case of interest" the monopulse radar system is further configured for amplitude comparison, first to the azimuth dimension, second to the elevation dimension and third grouped in range bins that are in the same azimuth and elevation bins.

In the step of adaptively applying elevation angular binning, the following sub-steps are included: determining a ground coverage of a beam in slant range, selecting a smallest beam in slant range between a covered range bin number and a bin number upper bounder as an elevation angular bin number, and determining a bin number upper bounder by a display monitor resolution.

In the step of adaptively applying azimuth angular binning, the following sub-steps are included, calculating an azimuth coverage of a beam on the ground and determining an azimuth angular bin number.

In the step of performing motion compensation the following steps are included: calculating a Doppler frequency value based on an aircraft velocity in a direction of a radar beam pointing angle of said real beam monopulse radar sensor and a radar wavelength, and calculating a range migration amount to be corrected based on said calculated Doppler frequency and a radar waveform sweeping rate.

In the step of obtaining target height estimation, a digital cartographic database is used to generate a synthetic three-dimensional view of an illuminated terrain.

The target data output matrix is a data matrix for image synthesis in the terrain morphing applications.

The invention may further include an system for generating a target data matrix providing a reduction in range and angular ambiguities output from a real beam monopulse radar sensor within a single beam for use in terrain morphing applications employed by brownout take-off and landing aid systems.

The system comprises means for calculating one or more range bins to selectively determine one or more range segments from one or more targets of interest. Means for range super resolution processing is employed to the selectively determined one or more range segments to obtain a range of target scatter locations. A means for monopulse angle bin estimation from the obtained range of target scatter locations and one or more control inputs is employed. A means for elevation and azimuth angular binning is then applied to the estimated monopulse angle bin to obtain a smaller coverage area among one or more possible target areas. A means for selecting one or more shortest-range bins in a two-dimensional (2D) azimuth and elevation grid is selected from the smaller coverage area, which generate the target data output matrix from the selected one or more shortest-range bins in the two-dimensional (2D) azimuth and elevation grid.

A corresponding method, program storage device, and computer program product may also be provided.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Hereinafter, embodiments of the present invention will be described in detail with reference to the accompanying drawings. For the purposes of clarity and simplicity, a detailed description of known functions and configurations incorporated herein will be omitted.

The present invention provides a method, system and computer program for reducing range and angular ambiguities in a target data matrix output from a real beam monopulse radar within a single beam for use in dynamic terrain morphing applications employed by brownout take-off and landing aid systems. Dynamic terrain morphing applications are applications such as VistaNav™ Synthetic Vision by Mercury computer systems, Inc that integrate terrain ranging data into three-dimensional (3 D) display in real time. The target data matrix generated by the present invention's monopulse radar signal processing (MRSP) is a result of processing raw data output from the monopulse radar (monopulse Sum and Difference channel data). The MRSP apparatus includes enhanced height measurement resolution by employing enhanced range resolution techniques. Moreover, the MRSP apparatus provides adaptability to rotorcraft attitude changes and landing scenario for data vector generation and image display convenience.

The data vectors contained in the target data matrix, as mentioned above are utilized for dynamic terrain morphing applications, which render three-dimensional (3D) synthesis and display ("Synthetic Vision display"). For example, as mentioned above, Mercury Computer Systems, Inc.' VistaNav™ Synthetic Vision technology can integrate the present inventions radar sensor readings (target data matrix) to generate a computerized 3D terrain map allowing rotorcraft pilots to "see" the surrounding terrain and obstacles whether or not they can actually see outside their cockpit window due to so-called brownout conditions.

Figure 1:
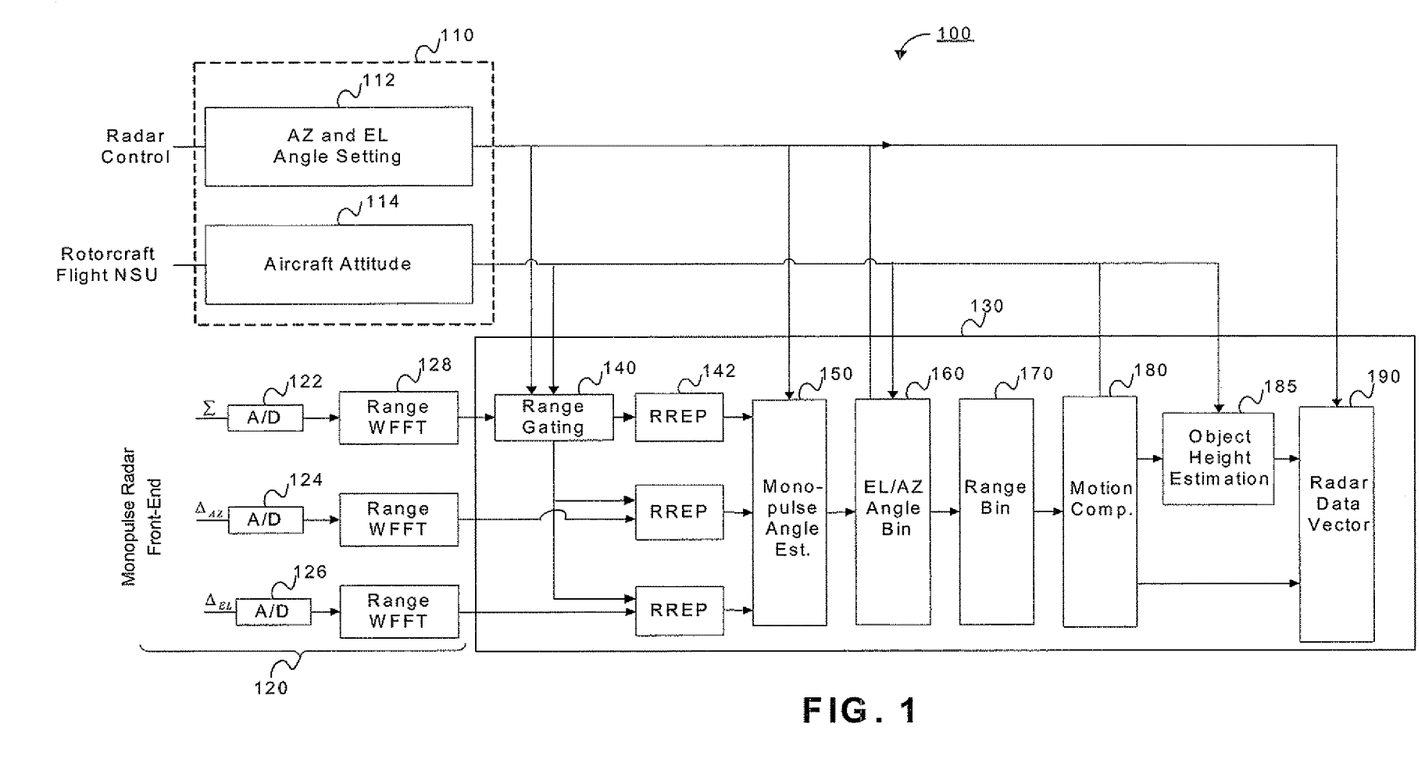
FIG. 1 depicts a functional block diagram of a monopulse radar signal processing (MRSP) apparatus for rotorcraft brownout landing aid system according to one embodiment of the invention.

FIG. 1 depicts a functional block diagram of a monopulse radar signal-processing (MRSP) algorithm for rotorcraft brownout landing aid system 100 according to one embodiment of the invention. As shown in FIG. 1, raw data output from the monopulse radar is preprocessed in preprocessing stage 120. A monopulse radar (not shown) and a rotorcraft flight programmable controller (not shown) provide control inputs in controller input stage 110. Both the controller input stage 110 and preprocessing stage 120 provide inputs for the monopulse radar signal-processing (MRSP) algorithm 130.

In the preprocessing stage 120, the monopulse radar's front-end outputs raw data, which includes the radar's Sum channel data $\Sigma$, azimuth Difference channel data $\Delta_{AZ}$, and elevation Difference channel data $\Delta_{EL}$. All three data, the $\Sigma$, $\Delta_{AZ}$, and $\Delta_{EL}$ are digitized via analog to digital converters 122, 124 and 126, respectively. Thereafter, a windowed fast Fourier transform (WFFT) operation is applied on the outputted digitized radar data. Controller input stage 110 illustrates how the monopulse radar obtains automatically or via user input azimuth and elevation settings 112 while a rotorcraft's navigation sensor unit NSU) provides real-time rotorcraft attitude parameters (e.g. pith, yaw, roll angles and the like) as shown in FIG. 1 aircraft attitude 114.

The monopulse radar signal processing (MRSP) algorithm 130 for rotorcraft brownout landing aid system 100 includes the following steps, range gating 140, range resolution enhancement processing (RSEP) 142, monopulse angle estimation 150, adaptive elevation and azimuth angular binning ("EL/AZ angle binning") 160, range bin selection 170, motion compensation 180, object height estimation 185 and radar data vector generation 190.

1. Range Gating

As known in the art, a frequency modulation (FM) waveform is typically employed to achieve high range resolution and a windowed fast Fourier transform (WFFT) module following a analog-to-digital converter (ADC) embedded in the radar front-end to generate the range profile extending to the whole radar operating range. In the first step of the MRSP algorithm 130, range gating 140 is applied to the digitized and transformed $\Sigma$ data output from the preprocessing stage 120 and inputs obtained from the controller input stage 110 to determine one or more proper range segments that may cover targets of interest (e.g. the area around the ground interception point for a rotorcraft landing aid system). In other words, range-gating 140 avoids processing the whole range profile and the entire computation load is kept to a manageable level.

As shown in FIG. 1 range gating 140 is implemented to include a rotorcraft's attitude parameters (e.g., pith, yaw, roll angles) 114, a calculated landing path geometry (e.g., gliding angle) and radar beam pointing angles and radar height above ground level (AGL) provided by the radar controller 112 to find the range bins around ground interception point and between the near and far boundary points of the antenna elevation beam. For processing flexibility, the present invention also includes certain range bins beyond the boundary points of the beam. In this way, the range gating can be implemented in an adaptive fashion according to the radar beam pointing angle and the radar height. The above described range gating can be implemented by way of digital signal processing (DSP), field programmable gate arrays (FPGAs) or a programmed microprocessor as known to those skilled in the art.

2. Range Resolution Enhancement Processing

Next, in step two of the MRSP algorithm 130 range resolution enhancement processing (RREP) 142 is applied to improve the target elevation angle (closely related to target height) estimation resolution, as described in co-pending patent application Ser. No. 12/233,173 filed on Sep. 18, 2008 for "RANGE AND AZIMUTH RESOLUTION ENHANCEMENT FOR REAL-BEAM RADAR." incorporated herein by reference. One of the objects of the present invention (MRSP) algorithm 130 is to improve the monopulse radar angle measurement resolution via enhancing its range resolution by means of resolution processing. For example, if more than one scatter exists in the same range bin and they are not resolved by other means, the monopulse angle measurement will result in one angle estimate that is a weighted average (by the scatters' signal intensities) of the angles of all the scatters in the range bin. Hence, the present invention MRSP algorithm 130 provides a straightforward approach to resolving the closely spaced scatters in range by means of range resolution enhancement in order to achieve improved monopulse angle measurement resolution.

RREP 142 employs a minimum variance method (MVM) (also referred to as Standard Capon Beamformer (SCB)) to achieve the range super resolution for target scatters' location (related to elevation angle) estimation. MVM, as shown in the above referenced Patent Application, provides an improvement in range resolution by 100% for 20 dB signal-to-noise ratio (SNR). One embodiment of the present invention provides for a combined approach of obtaining accurate location and amplitude estimates when the target scatters' amplitudes are of interest. The above described Range Resolution Enhancement Processing can be implemented by way of digital signal processing (DSP), field programmable gate arrays (FPGAs) or a programmed microprocessor as known to those skilled in the art.

3. Monopulse Angle Estimation

After applying RREP 142, the third step of the MRSP algorithm 130 provides a monopulse angle estimation 150 which is an amplitude comparison monopulse technique utilized to measure the angular errors of targets away from the beam center for all range bins within a specific range gate that is dynamically determined to cover a ground region within a potential landing zone (LZ) area. A monopulse angle update function is used to generate the monopulse angle measurements for each range bin by adding the beam pointing angles to the corresponding monopulse angular errors. A pre-set SNR threshold is applied to the Sum channel prior to making a monopulse angle update to screen out the range bins that have weak radar returns.

In the step of monopulse angle estimation 150, there are provided three cases of interest that include: (1) elevation monopulse only, (2) simultaneous azimuth and elevation monopulse, and (3) alternative azimuth and elevation monopulse. As mentioned above with reference to FIG. 1, the controller input stage 110 can be manipulated by various inputs dictated by a user (rotorcraft pilot). In particular, the present invention allows a rotorcraft pilot to manipulate the cockpit radar console to control azimuth and elevation settings 112 such as the three cases of interest (1) through (3) listed above. For example, a rotorcraft pilot may be in a certain brownout condition where the rotorcraft pilot is only interested in elevation as in case of interest (1) or the rotorcraft pilot may wish to see simultaneous azimuth and elevation monopulse as in case of interest (2). The method of the present invention provides the rotorcraft pilot with this flexibility in the step of monopulse angle estimation 150 where three cases of interest are provided.

In case (1), the system is aimed to attain accurate target elevation angle measurement and no monopulse is applied to azimuth dimension AZ. In the case of elevation monopulse only, as the name suggests amplitude comparison monopulse processing is only applied to the elevation dimension EL. The azimuth angle measurement of the target is readily given by the radar antenna beam-pointing angle.

In case (2), the Sum and Difference channel data as shown in FIG. 1, are collected with one FM pulse for both azimuth and elevation monopulse. In this case Sum and difference beams of both elevation and azimuth monopulse illuminate the same ground area. Amplitude comparison monopulse angle estimation is applied first to azimuth dimension AZ and then to elevation dimension EL (as illuminated in FIG. 2, discussed below). Afterwards the range bins are grouped in the same azimuth and elevation bins.

In case (3), the Sum and Difference channel data are collected at alternative FM pulses for azimuth and elevation monopulse. In this case, the two FM pulses do not illuminate that same area on the ground in a dynamic landing process. A similar process as in the case (2) is applied but an added step (prior to performing azimuth monopulse processing) is applied to determine the overlapped area illuminated by the two pulses. The processing of case (3) requires at least 50% overlap of the alternative FM pulses due to the fact that this specified scan involves a large area on the ground and includes gaps. The above described Monopulse Angle Estimation can be implemented by way of digital signal processing (DSP), field programmable gate arrays (FPGAs) or a programmed microprocessor as known to those skilled in the art.

4. Adaptive Angular Binning

In the fourth step of the MRSP algorithm 130, an adaptive elevation EL and azimuth AZ angular binning 160 approach is employed to take into account the tradeoff between number of range bins within in the ground coverage and display resolution. For elevation angular binning, the ground coverage of the beam in slant is first determined range (similar to the range gating step one). After determining the ground coverage, the smaller one between the covered range bin number and the bin number upper bounder is selected as the elevation angular bin number. In other words a smaller coverage area is selected among the possible target areas. The bin number upper bounder is determined by the display monitor resolution.

For azimuth angular binning, the azimuth coverage of the beam on the ground is first calculated then the azimuth angular bin number is determined in a similar way as the elevation angular binning described above. However, the azimuth angular bin number is set to one when no azimuth monopulse is employed such as when monopulse angle estimation 150, case (1) is applied. The above described Adaptive Angular Binning can be implemented by way of digital signal processing (DSP), field programmable gate arrays (FPGAS) or a programmed microprocessor as known to those skilled in the art.

5. Range Bin Selection

In the fifth step of the MRSP algorithm 130, range bin selection 170 is applied to select the shortest-range bins at angle cells in the two-dimensional (2D) azimuth and elevation grid. To this end, all range bins that are located in the same azimuth bin and the same elevation bin are grouped and the first range bin (corresponding to the highest point) in the same group are selected. The above described Range Bin Selection can be implemented by way of digital signal processing (DSP), field programmable gate arrays (FPGAs) or a programmed microprocessor as known to those skilled in the art.

6. Motion Compensation

Next, in the sixth step of the MRSP algorithm 130, motion compensation is performed to compensate out the Doppler Effect due to the relative motion between the aircraft and the illuminated targets. For each pulse at each beam point location, the Doppler frequency value and the range migration amount to be compensated out are calculated based on the aircraft velocity in the direction of the radar beam pointing angle and the radar wavelength, and the range migration amount to be compensated out is determined by the Doppler frequency and the radar waveform sweeping rate. The above described Motion compensation can be implemented by way of digital signal processing (DSP), field programmable gate arrays (FPGAs) or a programmed microprocessor as known to those skilled in the art.

7. Object Height Estimation

In the seventh step of the MRSP algorithm 130, object height estimation 185 is obtained by making use of the object elevation angle measurement and the radar height data. The object height information can be later used by a synthetic vision display which together with a digital terrain elevation data (DTED) database can generate a synthetic 3D view of the illuminated terrain. The above described Object Height Estimation can be implemented by way of digital signal processing (DSP), field programmable gate arrays (FPGAs) or a programmed microprocessor as known to those skilled in the art.

8. Radar Data Output Vector

Finally, in the eighth step of the MRSP algorithm 130, the radar data output vector consists of azimuth and elevation angles, range to the radar sensor, intensity, and height of detected targets therefore forming a "target data matrix." As mentioned above, the target data matrix is utilized for dynamic terrain morphing applications, which render three-dimensional (3D) synthesis and display ("Synthetic Vision display").

Figure 2:
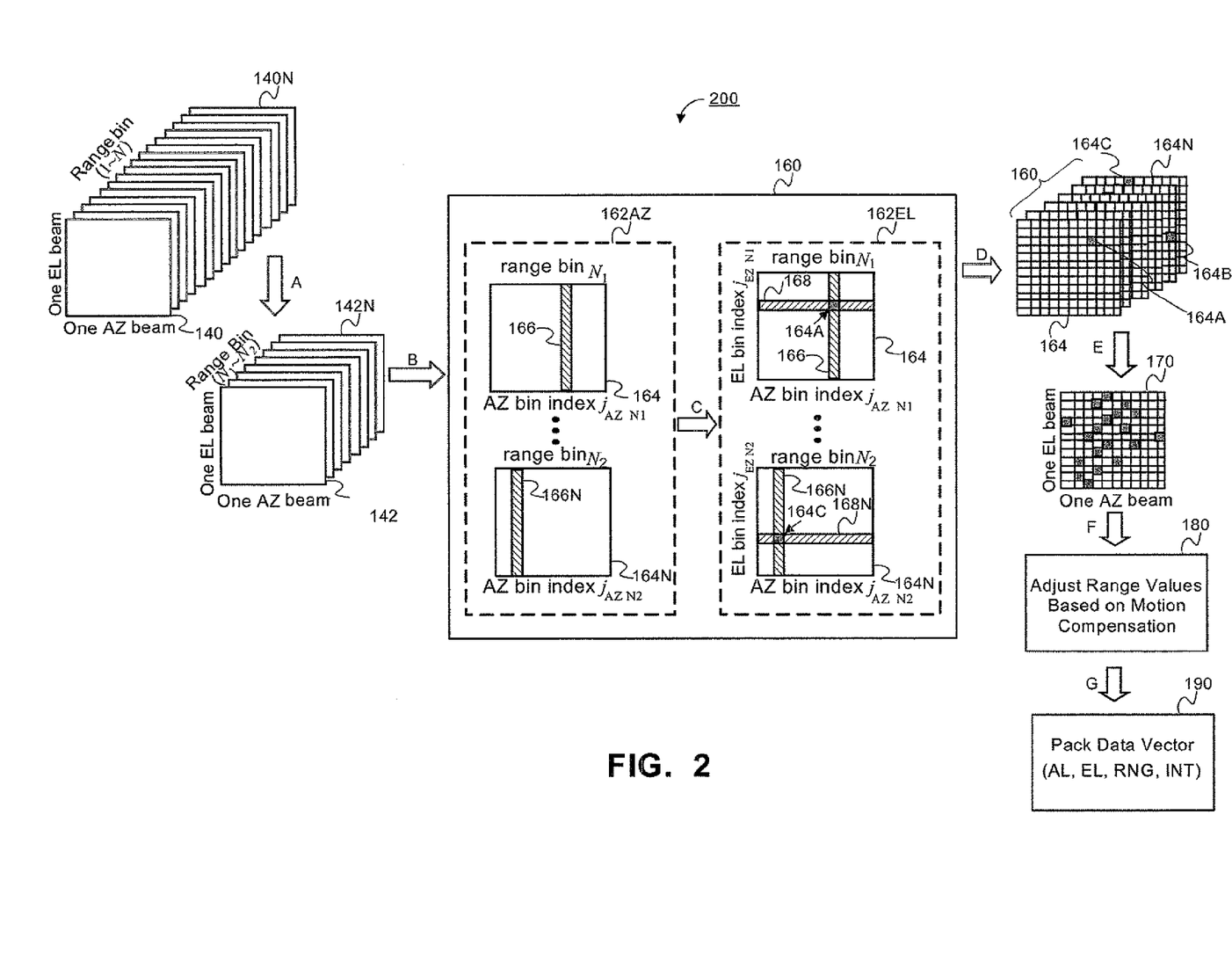
FIG. 2 depicts a flow diagram for the monopulse radar signal processing method and apparatus, according to one embodiment of the present invention.
Figure 3A:
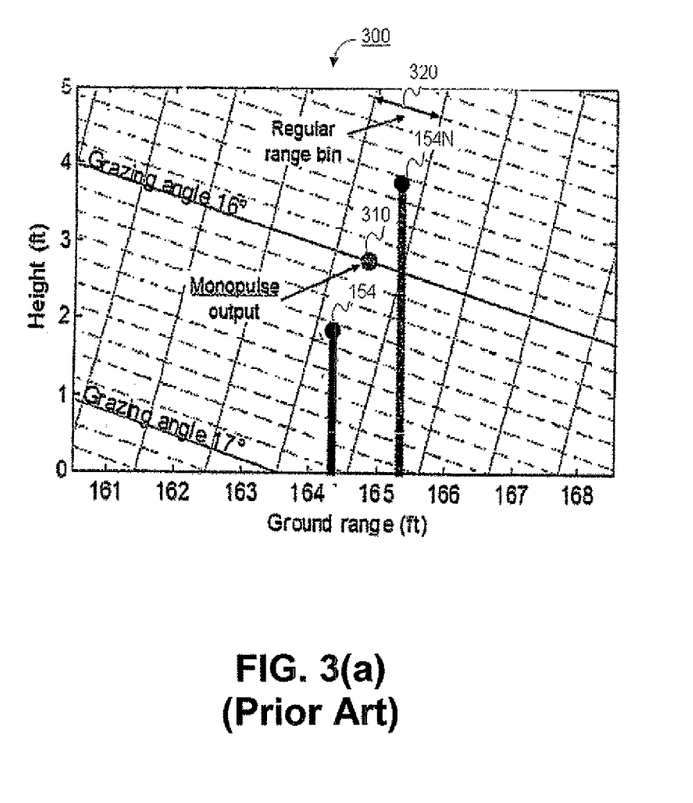
FIG. 3(a) illustrates the conventional monopulse angle resolution method and apparatus.
Figure 3B:
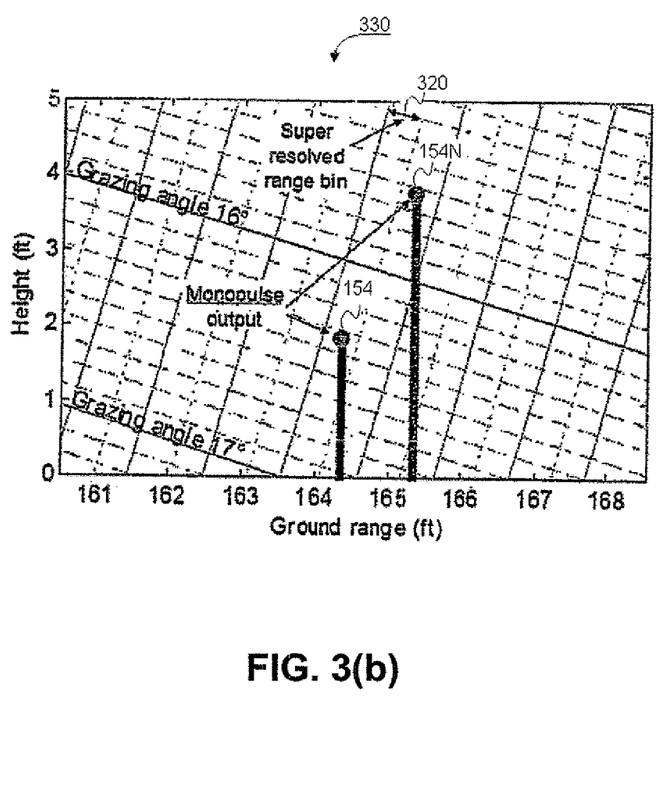
FIG. 3(b) illustrates a monopulse angle resolution method and apparatus employing range resolution enhancement, according to one embodiment of the present invention.

Now hereafter referring to FIGS. 2 and 3, an example of the MRSP algorithm 130 shall be provided. FIG. 2 depicts a flow diagram of the monopulse radar signal processing approach 200 with respect to two closely spaced targets, according to one embodiment of the present invention. As shown in FIG. 2 range bin (1-N) in a range segment includes a plurality of range bins including one azimuth beam and one elevation beam. Each range bin (1-N) results from the range gating step 140 described above including data from both the control input stage 110 and the preprocessing stage 120. Then the range resolution enhanced processing step 142 is applied to each range segment to generate range resolution enhanced bins ($N_1$ through $N_2$). Next, monopulse angle estimation 150, case (3) is applied (as an example). Then EL/AZ angle binning 160 is applied, first as to azimuth dimension 162AZ then to the elevation dimension 162EL. For example, range bin $N_1$ 164 (potential target #1) through $N_2$ 164N (potential #2) are shown from the plurality of range bins including one azimuth beam and one elevation beam where AZ bin 166 and AZ bin N 166N are shown representing the azimuth of the two potential targets. In the elevation dimension, angle binning 160 is applied 162EL to range bin $N_1$ 164 (potential target #1) through $N_2$ 164N (potential target #2) where EL bin 168 and EL bin N 168N are shown representing the elevation of the two closely spaced potential targets (potential target #1 and #2).

As shown in FIG. 2, both the AZ bin 166 and EL bin 168 overlap and next adaptive angular binning 160 is applied where AZ and EL bins are similarly grouped together. As can be seen a first range bin 164A is selected and arranged as well as a second range bin 164B and a third range bin 164c. Thereafter range bin selection 170 is applied to select the shortest range bins in each group. Thereafter the range values are adjusted based upon motion compensation 180 and the data vector is packed (e.g. AZ, EL, RNG, INT) representing the target data matrix 190. That is the target values representing azimuth AZ, elevation AZ, range RNG, and intensity INT which form the target data matrix that is utilized by the above described dynamic terrain morphing application.

Referring now to FIGS. 3(*a*) and 3(*b*), an illustration of the above described MRSP example is provided showing both the conventional monopulse angle resolution approach 300 and the present inventions monopulse angle resolution approach 330 employing range resolution enhancement with respect to two closely spaced targets is shown according to one embodiment of the present invention. In both FIGS. 3(*a*) and 3(*b*), two closely spaced potential targets are shown 154 and 154N as closely spaced apart with respect to ground range and height. In FIG. 3(*a*). However, in the conventional approach 300, the range bin 320 is not as accurate as in the present invention.

Therefore, the above described invention provides a means, method and computer program for reducing range and angular ambiguities in a target data matrix output from a real beam monopulse radar within a single beam for use in dynamic terrain morphing applications employed by brown-out take-off and landing aid systems. The target data matrix generated by the present invention's monopulse radar signal processing (MRSP) is a result of processing raw data output from the monopulse radar (monopulse Sum and Difference channel data). The MRSP includes enhanced height measurement resolution by employing enhanced range resolution techniques. Moreover, the MRSP provides adaptability to rotorcraft attitude changes and landing scenario for data vector generation and image display convenience.

As will be readily apparent to those skilled in the art, the present invention or aspects of the invention can be realized in hardware, or as some combination of hardware and software. Any kind of computer/server system(s)—or other apparatus adapted for carrying out the methods described herein—is suitable. A typical combination of hardware and software could be a general-purpose computer system with a computer program that, when loaded and executed, carries out methods described herein. Alternatively, a specific use computer, containing specialized hardware for carrying out one or more of the functional tasks of the invention, could be utilized.

The present invention or aspects of the invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A method of reducing range and angular ambiguities in a target data matrix output from a real beam monopulse radar sensor within a single beam for use in terrain morphing applications employed by brownout take-off and landing aid systems, comprising the steps of:
    calculating one or more range bins disposed at a ground interception point and between at least one near and far boundary points of an antenna elevation beam to selectively determine one or more range segments from one or more targets of interest;
    adaptively applying range resolution enhancement processing to said selectively determined one or more range segments to obtain a range of target scatter locations;
    estimating a monopulse angle bin from said obtained range of target scatter locations and one or more control inputs;
    adaptively applying elevation and azimuth angular binning to said estimated monopulse angle bin to obtain a smaller coverage area among one or more possible target areas;
    selecting one or more shortest-range bins in a two-dimensional (2D) azimuth and elevation grid from said smaller coverage area; and
    generating said target data output matrix from said selected one or more shortest-range bins in said two-dimensional (2D) azimuth and elevation grid.

2. The method of claim 1, wherein the step of adaptively applying range super resolution processing employs Capon Beamforming (CB) filtering to pass a frequency f of interest undistorted while attenuating all other frequencies.

3. The method of claim 1, wherein the step of estimating said monopulse angle bin is obtained by selecting from at least one case of interest, consisting of:
    (1) elevation monopulse only;
    (2) simultaneous azimuth and elevation monopulse; and
    (3) alternative azimuth and elevation monopulse.

4. The method of claim 1, wherein the step of selecting one or more shortest-range bins in said two-dimensional (2D) azimuth and elevation grid, groups all range bins that are located in the same azimuth bin, groups all elevation bins that are located in the same elevation bin, and the first range bin in the same group are selected.

5. The method of claim 4, wherein the step of selecting one or more shortest-range bins in said two-dimensional (2D) azimuth and elevation grid further comprises the steps of:
    performing motion compensation on said grouped range and elevation bins for eliminating Doppler effect due to relative motion between an aircraft and an illuminated target; and
    obtaining a target height estimation from an object elevation angle measurement and a radar height data output from said one or more control inputs.

6. The method of claim 1, wherein the target data output matrix comprises:
    one or more azimuth angle vectors;
    one or more elevation angle vectors;
    a vector indicating a range to said real beam monopulse radar sensor; and
    a vector indicating intensity and height of said one or more targets of interest.

7. The method of claim 1, wherein the step of calculating one or more range bins is based upon an aircraft's attitude parameters and guide angle, and said monopulse radar's radar beam pointing angles and height above ground level.

8. The method of claim 3, wherein said (1) elevation monopulse only case of interest is configured for aiming said monopulse radar system to attain target elevation angle measurement and no monopulse is applied to the azimuth dimension.

9. The method of claim 3, wherein said (2) simultaneous azimuth and elevation monopulse case of interest is further configured for amplitude comparison, first to the azimuth dimension, second to the elevation dimension and third grouped in range bins that are in the same azimuth and elevation bins.

10. The method of claim 1, wherein said step of adaptively applying elevation angular binning further comprises the sub-steps of:
    determining a ground coverage of a beam in slant range;
    selecting a smallest beam in slant range between a covered range bin number and a bin number upper bounder as an elevation angular bin number; and
    determining a bin number upper bounder by a display monitor resolution.

11. The method of claim 1, wherein said step of adaptively applying azimuth binning further comprises the sub-steps of:
    calculating an azimuth coverage of a beam on the ground; and
    determining an azimuth angular bin number.

12. The method of claim 5, wherein said step of performing motion compensation further includes the steps of:
    calculating a Doppler frequency value based on an aircraft velocity in a direction of a radar beam pointing angle of said real beam monopulse radar sensor and a radar wavelength; and
    calculating a range migration amount to be corrected based on said calculated Doppler frequency and a radar waveform sweeping rate.

13. The method of claim 5, wherein said step of obtaining a target height estimation is employed together with a digital cartographic database to generate a synthetic three-dimensional view of an illuminated terrain.

14. The method of claim 1, wherein said generated target data output matrix is a data matrix for image synthesis in said terrain morphing applications.

15. A system for generating a target data matrix providing a reduction in range and angular ambiguities output from a real beam monopulse radar sensor within a single beam for use in terrain morphing applications employed by brownout take-off and landing aid systems, comprising:
- means for calculating one or more range bins disposed at a ground interception point and between at least one near and far boundary point of an antenna elevation beam to selectively determine one or more range segments from one or more targets of interest;
- means for adaptively applying range super resolution processing to said selectively determined one or more range segments to obtain a range of target scatter locations;
- means for estimating a monopulse angle bin from said obtained range of target scatter locations and one or more control inputs;
- means for adaptively applying elevation and azimuth angular binning to said estimated monopulse angle bin to obtain a smaller coverage area among one or more possible target areas;
- means for selecting one or more shortest-range bins in a two-dimensional (2D) azimuth and elevation grid from said smaller coverage area; and
- means for generating said target data output matrix from said selected one or more shortest-range bins in said two-dimensional (2D) azimuth and elevation grid.

16. The system of claim 15, wherein the means for adaptively applying range super resolution processing employs a Capon Beamforming (CB) filter to pass a frequency f of interest undistorted while attenuating all other frequencies.

17. The system of claim 15, wherein the means for estimating said monopulse angle bin is obtained by selecting from at least one case of interest, consisting of:
(1) elevation monopulse only;
(2) simultaneous azimuth and elevation monopulse; and
(3) alternative azimuth and elevation monopulse.

18. The system of claim 15, wherein the means for selecting one or more shortest-range bins in said two-dimensional (2D) azimuth and elevation grid further comprises:
- means for grouping all range bins that are located in the same azimuth bin;
- means for grouping all elevation bins that are located in the same elevation bin; and
- means for selecting the first range bin in the same group.

19. The system of claim 18, wherein the means for selecting one or more shortest-range bins in said two-dimensional (2D) azimuth and elevation grid further comprises:
- means for performing motion compensation on said grouped range and elevation bins for eliminating Doppler effect due to relative motion between an aircraft and an illuminated target; and
- means for obtaining a target height estimation from an object elevation angle measurement and a radar height data output from said one or more control inputs.

20. The system of claim 15, wherein the target data output matrix comprises:
- one or more azimuth angle vectors;
- one or more elevation angle vectors;
- a vector indicating a range to said real beam monopulse radar sensor; and
- a vector indicating intensity and height of said one or more targets of interest.

21. The system of claim 15, wherein the means for calculating one or more range bins is based upon an aircraft's attitude parameters and guide angle, and said monopulse radar's radar beam pointing angles and height above ground level.

22. The system of claim 17, wherein said (1) elevation monopulse only case of interest is configured for aiming said monopulse radar system to attain target elevation angle measurement and no monopulse is applied to the azimuth dimension.

23. The system of claim 17, wherein said (2) simultaneous azimuth and elevation monopulse case of interest is further configured for amplitude comparison, first to the azimuth dimension, second to the elevation dimension and third grouped in range bins that are in the same azimuth and elevation bins.

24. The system of claim 15, wherein said means for adaptively applying elevation angular binning further comprises:
- means for determining a ground coverage of a beam in slant range;
- means for selecting a smallest beam in slant range between a covered range bin number and a bin number upper bounder as an elevation angular bin number; and
- means for determining a bin number upper bounder by a display monitor resolution.

25. The system of claim 15, wherein said means for adaptively applying azimuth angular binning further comprises:
- means for calculating an azimuth coverage of a beam on the ground; and
- means for determining an azimuth angular bin number.

26. The system of claim 19, wherein said means for performing motion compensation further comprises:
- means for calculating a Doppler frequency value based on an aircraft velocity in a direction of a radar beam pointing angle of said real beam monopulse radar sensor and a radar wavelength; and
- means for calculating a range migration amount to be corrected based on said calculated Doppler frequency and a radar waveform sweeping rate.

27. The system of claim 19, wherein said means for obtaining a target height estimation is employed together with a digital cartographic database to generate a synthetic three-dimensional view of an illuminated terrain.

28. The system of claim 15, wherein said generated target data output matrix is a data matrix for image synthesis in said terrain morphing applications.

29. A program storage device readable by a machine, tangibly embodying a program of instructions executable by the machine to perform a method of reducing range and angular ambiguities in a target data matrix output from a real beam monopulse radar sensor within a single beam for use in terrain morphing applications employed by brownout take-off and landing aid systems, comprising the steps of:
- calculating one or more range bins disposed at a ground interception point and between at least one near and far boundary point of an antenna elevation beam to selectively determine one or more range segments from one or more targets of interest;
- adaptively applying range super resolution processing to said selectively determined one or more range segments to obtain a range of target scatter locations;
- estimating a monopulse angle bin from said obtained range of target scatter locations and one or more control inputs;
- adaptively applying elevation and azimuth angular binning to said estimated monopulse angle bin to obtain a smaller coverage area among one or more possible target areas;
- selecting one or more shortest-range bins in a two-dimensional (2D) azimuth and elevation grid from said smaller coverage area; and
- generating said target data output matrix from said selected one or more shortest-range bins in said two-dimensional (2D) azimuth and elevation grid.

* * * * *